United States Patent
Singer (10) Patent No.: US 8,953,795 B2
(45) Date of Patent: Feb. 10, 2015

(54) FORENSIC DECRYPTION TOOLS

(75) Inventor: Mitch Singer, Culver City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 1042 days.

(21) Appl. No.: 12/325,959

(22) Filed: Dec. 1, 2008

(65) Prior Publication Data

US 2009/0245514 A1    Oct. 1, 2009

Related U.S. Application Data

(60) Provisional application No. 60/991,624, filed on Nov. 30, 2007, provisional application No. 60/992,007, filed on Dec. 3, 2007.

(51) Int. Cl.

| | |
|---|---|
| *H04N 7/167* | (2011.01) |
| *G06F 21/00* | (2013.01) |
| *H04L 9/32* | (2006.01) |
| *G06F 21/10* | (2013.01) |
| *H04N 21/258* | (2011.01) |
| *H04N 21/4405* | (2011.01) |
| *H04N 21/6334* | (2011.01) |
| *H04N 21/81* | (2011.01) |
| *H04N 21/8355* | (2011.01) |
| *H04N 21/8358* | (2011.01) |
| *G11B 20/00* | (2006.01) |

(52) U.S. Cl.
CPC  *H04L 9/32* (2013.01); *G06F 21/10* (2013.01); *H04N 21/25875* (2013.01); *H04N 21/4405* (2013.01); *H04N 21/6334* (2013.01); *H04N 21/8173* (2013.01); *H04N 21/8193* (2013.01); *H04N 21/8355* (2013.01); *H04N 21/8358* (2013.01); *G11B 20/00086* (2013.01); *G11B 20/00166* (2013.01); *G11B 20/00173* (2013.01); *G11B 20/0021* (2013.01); *G11B 20/00731* (2013.01); *G11B 20/00753* (2013.01); *G11B 20/00869* (2013.01); *G11B 20/00884* (2013.01); *G11B 2220/2541* (2013.01); *G11B 2220/2562* (2013.01)

USPC ............. 380/202; 726/31; 726/27; 726/28; 726/29; 705/51; 705/57; 705/58; 705/59; 713/176

(58) Field of Classification Search
USPC ..................................... 380/202
See application file for complete search history.

(56) References Cited

U.S. PATENT DOCUMENTS

| | | | | |
|---|---|---|---|---|
| 6,070,171 | A * | 5/2000 | Snyder et al. ............... | 1/1 |
| 6,550,011 | B1 * | 4/2003 | Sims, III .................. | 713/193 |
| 6,691,229 | B1 * | 2/2004 | Nelson ...................... | 713/193 |
| 6,766,305 | B1 * | 7/2004 | Fucarile et al. ............ | 705/51 |
| 6,868,405 | B1 * | 3/2005 | DeTreville ................. | 705/58 |
| 6,980,652 | B1 * | 12/2005 | Braitberg et al. .......... | 380/201 |
| 7,058,809 | B2 * | 6/2006 | White et al. ................ | 713/176 |
| 7,215,610 | B2 * | 5/2007 | Sako et al. ................. | 369/47.12 |
| 7,228,425 | B1 * | 6/2007 | Staring et al. ............. | 713/176 |

(Continued)

*Primary Examiner* — Carolyn B Kosowski (74) *Attorney, Agent, or Firm* — Procopio, Cory, Hargreaves & Savitch LLP (57) ABSTRACT

Providing authorized copies of encrypted media content including: receiving application for authentication to make copies of the media content; providing forensic decryption tools to process the media content; transmitting a permission to make copies of the media content using the forensic decryption tools; performing authorized decryption of the media content; and making and forensically marking copies of the decrypted media content.

29 Claims, 5 Drawing Sheets

(56) References Cited

U.S. PATENT DOCUMENTS

| | | | |
|---|---|---|---|
| 7,260,557 B2 * | 8/2007 | Chavez | 705/59 |
| 7,277,601 B2 * | 10/2007 | Zorab et al. | 382/305 |
| 7,308,430 B2 * | 12/2007 | Odgers et al. | 705/57 |
| 7,328,345 B2 * | 2/2008 | Morten et al. | 713/176 |
| 7,382,905 B2 * | 6/2008 | Venkatesan et al. | 382/124 |
| 7,570,761 B2 * | 8/2009 | Risan et al. | 380/201 |
| 7,647,277 B1 * | 1/2010 | Blumenfeld et al. | 705/54 |
| 7,684,652 B2 * | 3/2010 | Zorab et al. | 382/305 |
| 7,689,823 B2 * | 3/2010 | Shen et al. | 713/153 |
| 7,720,767 B2 * | 5/2010 | Ta et al. | 705/59 |
| 7,747,875 B2 * | 6/2010 | Cookson et al. | 713/193 |
| 2002/0120849 A1 * | 8/2002 | McKinley et al. | 713/176 |
| 2003/0195852 A1 * | 10/2003 | Campbell et al. | 705/51 |
| 2004/0098593 A1 * | 5/2004 | Muratani | 713/176 |
| 2004/0117440 A1 * | 6/2004 | Singer et al. | 709/203 |
| 2004/0133794 A1 * | 7/2004 | Kocher et al. | 713/193 |
| 2004/0189682 A1 * | 9/2004 | Troyansky et al. | 345/700 |
| 2005/0010811 A1 * | 1/2005 | Zimmer et al. | 713/201 |
| 2005/0097331 A1 * | 5/2005 | Majidimehr et al. | 713/176 |
| 2005/0144136 A1 * | 6/2005 | Murashita | 705/51 |
| 2005/0154892 A1 * | 7/2005 | Mihcak et al. | 713/176 |
| 2006/0156003 A1 * | 7/2006 | Zhang et al. | 713/176 |
| 2006/0200416 A1 * | 9/2006 | White et al. | 705/50 |
| 2007/0038861 A1 * | 2/2007 | Weber et al. | 713/176 |
| 2007/0078777 A1 * | 4/2007 | Demartini et al. | 705/59 |
| 2007/0118641 A1 * | 5/2007 | Zhuo et al. | 709/224 |
| 2007/0220266 A1 * | 9/2007 | Cooper et al. | 713/176 |
| 2008/0010459 A1 * | 1/2008 | Knoll et al. | 713/176 |
| 2008/0040522 A1 * | 2/2008 | Matthews | 710/107 |
| 2008/0065551 A1 * | 3/2008 | Niakan et al. | 705/59 |
| 2008/0091790 A1 * | 4/2008 | Beck | 709/217 |
| 2008/0137848 A1 * | 6/2008 | Kocher et al. | 380/201 |
| 2008/0199006 A1 * | 8/2008 | Gandolph et al. | 380/201 |
| 2008/0215491 A1 * | 9/2008 | Miller | 705/59 |
| 2008/0288411 A1 * | 11/2008 | Copley | 705/52 |
| 2009/0019544 A1 * | 1/2009 | Suffern et al. | 726/22 |
| 2009/0316890 A1 * | 12/2009 | Schultz | 380/203 |
| 2010/0082478 A1 * | 4/2010 | Van Der Veen et al. | 705/39 |

\* cited by examiner

FORENSIC DECRYPTION TOOLS

CROSS-REFERENCE TO RELATED APPLICATIONS

This application claims the benefits of priority of U.S. Provisional Patent Application No. 60/991,624, filed Nov. 30, 2007, entitled "Forensic Decryption Tools" and U.S. Provisional Patent Application No. 60/992,007, filed Dec. 3, 2007, entitled "Forensic Decryption Tools." The disclosures of the above-referenced patent applications are incorporated herein by reference.

BACKGROUND

Many commercially-produced media discs (e.g., DVD-Video discs) use digital rights management (DRM) schemes to prevent unauthorized copying of content on the media discs. However, the rapid growth of the Internet and the resulting possibility of copying and dissemination of digital data have led to growing demand for ways to prevent these illegal activities and to protect copyright holders against the problems associated with pirated copies. For example, unauthorized copies can be made of an authorized distribution copy (e.g., a commercial copy) of digital data.

SUMMARY

To discourage, prevent, or inhibit the proliferation of unauthorized copies, it is often useful to provide ways to make authorized copies but to track or monitor the use of the authorized copies. Embodiments of the present invention provide for decryption to make authorized copies of the media content in return for forensically marking the copies, and to track or monitor the use of the copies.

In one implementation, a method of providing authorized copies of encrypted media content is disclosed. The method including: receiving application for authentication to make copies of the media content; providing forensic decryption tools to process the media content; transmitting a permission to make copies of the media content using the forensic decryption tools; performing authorized decryption of the media content; and making and forensically marking copies of the decrypted media content.

In another implementation, a forensic decryption system for providing authorized copies of encrypted media content is disclosed. The system including: at least one decryption tool; a processor configured to receive application for authentication to make copies of the media content, and to direct at least one decryption tool to perform decryption of the encrypted media content when a permission is received to make the copies of the media content; and a forensic information applicator configured to make and forensically mark copies of the media content decrypted by at least one decryption tool, wherein the copies of the media content are marked with forensic information.

Other features and advantages of the present invention will become more readily apparent to those of ordinary skill in the art after reviewing the following detailed description and accompanying drawings.

DETAILED DESCRIPTION

Certain implementations as disclosed herein provide for authorized decryption of media content. One implementation includes forensic tools capable of providing authorized decryption of the media content. In one case, the media content is provided on media discs. In another case, the media content is downloadable from a website. The forensic tools can provide for decryption to make authorized copies of the media content in return for forensically marking the copies, and to monitor/track the use of the copies.

After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

Figure 1:
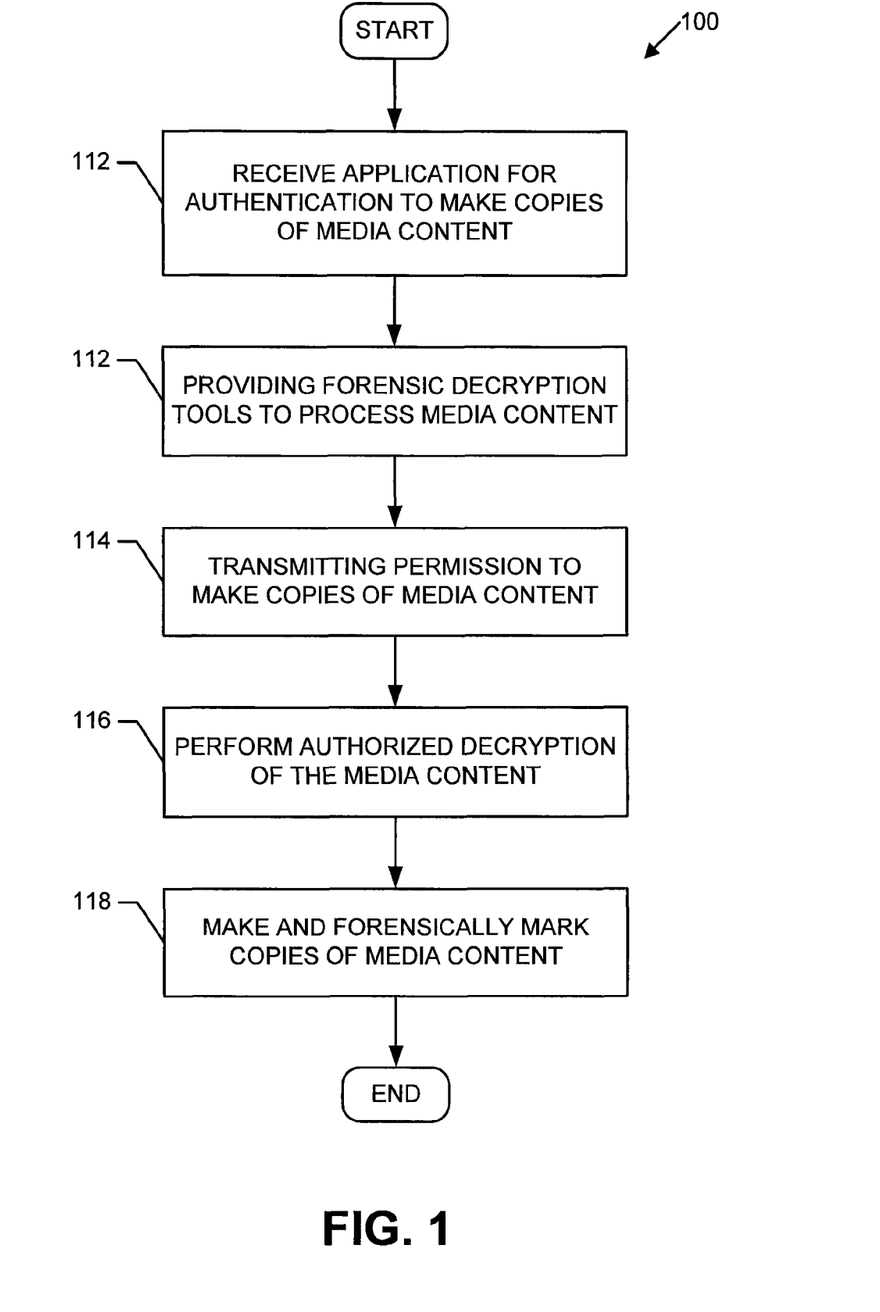
FIG. 1 is a flowchart illustrating a process of providing authorized copies of encrypted media content.

FIG. 1 is a flowchart illustrating a process 100 of providing authorized copies of encrypted media content in accordance with one implementation of the present invention. In one case, the encrypted media content is provided on media such as an optical disc (e.g., DVD or Blu-ray Disc). In another case, the media content can be downloaded from a designated website or other network source.

At box 110, an application is received for authentication to make copies of the media content. In one implementation, the application is received to authenticate a user/copier of the media content. In one case, the user/copier can be authenticated when the user/copier first obtains the media disc. In another case, the user/copier can be authenticated when the user/copier applies to make authorized copies of the media disc, for example, when submitting a user ID and a password through an online authentication service. In another implementation, the application is received to obtain permission from a rights holder (or an agent) to make authorized copies of the media content. In yet another implementation, the application is received to obtain permission from a rights management entity such as the DVD Copy Control Association (DVD CCA) to make authorized copies of the media content. The media content is then processed, at box 112, by forensic decryption tools. In a first implementation, the decryption tools are provided (e.g., on a media disc or downloaded from a website) when requested. In a second implementation, the decryption tools are provided or embedded with the media content which has already been obtained by the user/copier. Thus, in the second implementation, the application for authentication requests permission to unlock or activate the decryption tools rather than requesting the decryption tools to be downloaded.

At box 114, permission is transmitted to make copies of the media content using the forensic decryption tools. In one implementation, the permission is embodied in some token/license information sent to the user/copier's forensic decryption tools. The token/license defines permitted uses of the media content, such as extent and limitations of the use.

Authorized decryption of the media content is performed, at box 116, and copies of the decrypted media content are then made and forensically marked, at box 118. The application of the forensic information includes modifying the data of the copy by adding, changing, and/or deleting data from the copy. In one implementation, the forensic information is used to: identify the user/copier; indicate the number of copies allowed; and/or indicate other related rights management parameters, such as time limits or limits on the level of copying allowed. The forensic information can include one or more watermarks applied to audio and/or video of the content. Other implementations can include different types of forensic information. Examples include, but are not limited to: removing, adding, modifying, and/or duplicating one or more image frames or other video and/or audio data in a pattern that identifies the copier; adding or removing color information from one or more pixels to identify the copier; or combining data from multiple marked sources in a pattern to identify the copier (see, e.g., U.S. Pat. No. 7,068,823 for "Fingerprinting of data").

In one implementation, the application of the forensic information (e.g., watermark(s)) occurs when the user/copier first obtains the media disc. In this implementation, the user/copier would already have been authenticated with watermark(s) possibly including other information such as the number of copies allowed. Thus, in this implementation, the media disc includes "activatable" watermark(s) where the permission process is automated. For example, a university buys a DVD knowing already that it plans to make 30 copies for a class. In this case, the university may prefer to receive something "ready to go" to make the copies, rather than getting the DVD and then requesting authorization. Thus, in this case, the contents of the DVD may not have been encrypted. The DVD would include the university's watermark and DRM information allowing the university to make 30 copies (or unlimited first generation copies but no further generation copies).

In another implementation, the user/copier has a decryption tool including data for forensic information to identify the user/copier. The user/copier submits an electronic request for a decryption tool with authentication information to an online tool provider such as the DVD CCA. The request could be non-electronic, such as by telephone or fax as well. After authenticating the user/copier, the tool provider generates forensic information (e.g., watermark data), embeds the forensic information in the tool (or includes it with the tool), and sends the tool to the authenticated requesting user/copier. When the user/copier uses the tool to decrypt content, the tool will include the forensic information in the decrypted copy. In one such case, the user decrypts compatible content repeatedly without further authorization or authentication with an online service. The tool itself can have a local authentication process. In another similar case, the content provider can provide two different versions of the same content: one that is compatible with the decryption tools and another that is not (and so can not be decrypted by the authorized tools). Alternatively, more than two versions can be made, for example, for different levels of trusted tool recipients.

In yet another implementation, the application of the forensic information (e.g., watermark(s)) can occur when the user/copier later applies to make authorized copies of the encrypted media disc. In this implementation, once the user/copier has been authenticated, the content on the media disc is decrypted, copies are made, forensic watermark(s) is applied, and/or a limited license is issued for the authorized copies to the user/copier. In one such implementation, the user/copier does not have a decryption tool. In this case, the user/copier submits a request for decrypted content to an online decryption service (e.g., the DVD CCA) with authentication information. After authenticating the user/copier, the decryption service either generates new forensic information or retrieves forensic information (or a combination) based on the received authentication information. The service then decrypts the requested content, embedding or including the forensic information, and sends the decrypted content (with the forensic information) to the authenticated requesting user/copier.

In some implementations, the application of the forensic information (e.g., watermark(s)) may further include adding visible marks or stamps on the physical disc or in the audio or images of the content. In the university example described above, the copy could include "UNIVERSITY OF X COPY" on the disc or as a logo in the corner of the visible image as seen on a display device. The marking would not interfere with the content, but may discourage further copying by the user/copier (e.g., students). In this example, the watermark for each copy can be distinct. For example, in a university setting, each copy could include the student ID of the student receiving the particular copy, with student ID possibly visible to the student. In one example implementation, the marking includes International Standard Audiovisual Number (ISAN) and the recipient/copier number (possibly registered in the same or a related central database as the ISAN numbers).

In a further implementation, the authentication of the user/copier includes identifying the user/copier so that the copies of the media disc can be forensically marked for tracking. The tracking of the use of the authorized copies includes monitoring any misuse of the limited license and/or tracing the source of the authorized copy. In one case, the recourse for misuse includes revoking the license where further use of the authorized copy does not qualify as a fair use and is identified as illegal. In another case, the recourse for misuse includes preventing further use of the copies by locking or encrypting the content on the media disc. In yet another case, the recourse for misuse includes modifying the limited license. In an online decryption service implementation, the service could disable the user/copier's authorization and so not provide further decryption service. In a local decryption tool implementation, the tool periodically contacts an online service to confirm that the tool is still valid. If the user/copier has been revoked, then the tool is updated to prevent further decryption, and playback if appropriate.

Figure 2:
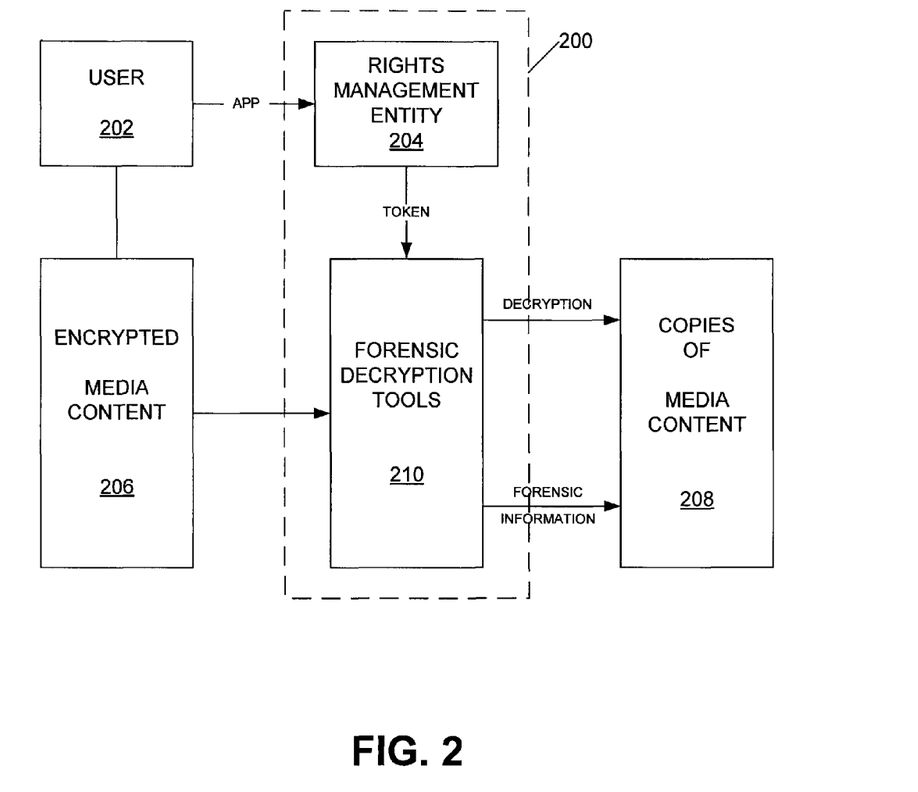
FIG. 2 is a flow diagram for providing authorized copies of encrypted media content using forensic decryption tools.

FIG. 2 is a flow diagram of a forensic decryption system 200 for providing authorized copies of encrypted media content using forensic decryption tools 210 in accordance with one implementation of the present invention. A user/copier 202 of the encrypted media content 206 submits an application for authentication to make copies of the media content. In the illustrated implementation of FIG. 2, the application is submitted to obtain permission from a rights management entity 204 such as the DVD Copy Control Association (DVD CCA) to make the authorized copies of the media content 206. The media content 206 is then submitted to forensic decryption tools 210.

In the illustrated implementation, the forensic decryption tools 210 receive the permission from the rights management entity 204 in the form of token/license information, which defines permitted uses (e.g., extent and limitations of the use) of the media content 206. The forensic decryption tools 210 perform authorized decryption of the media content, and make and forensically mark copies of the decrypted media content 208.

Figure 3:
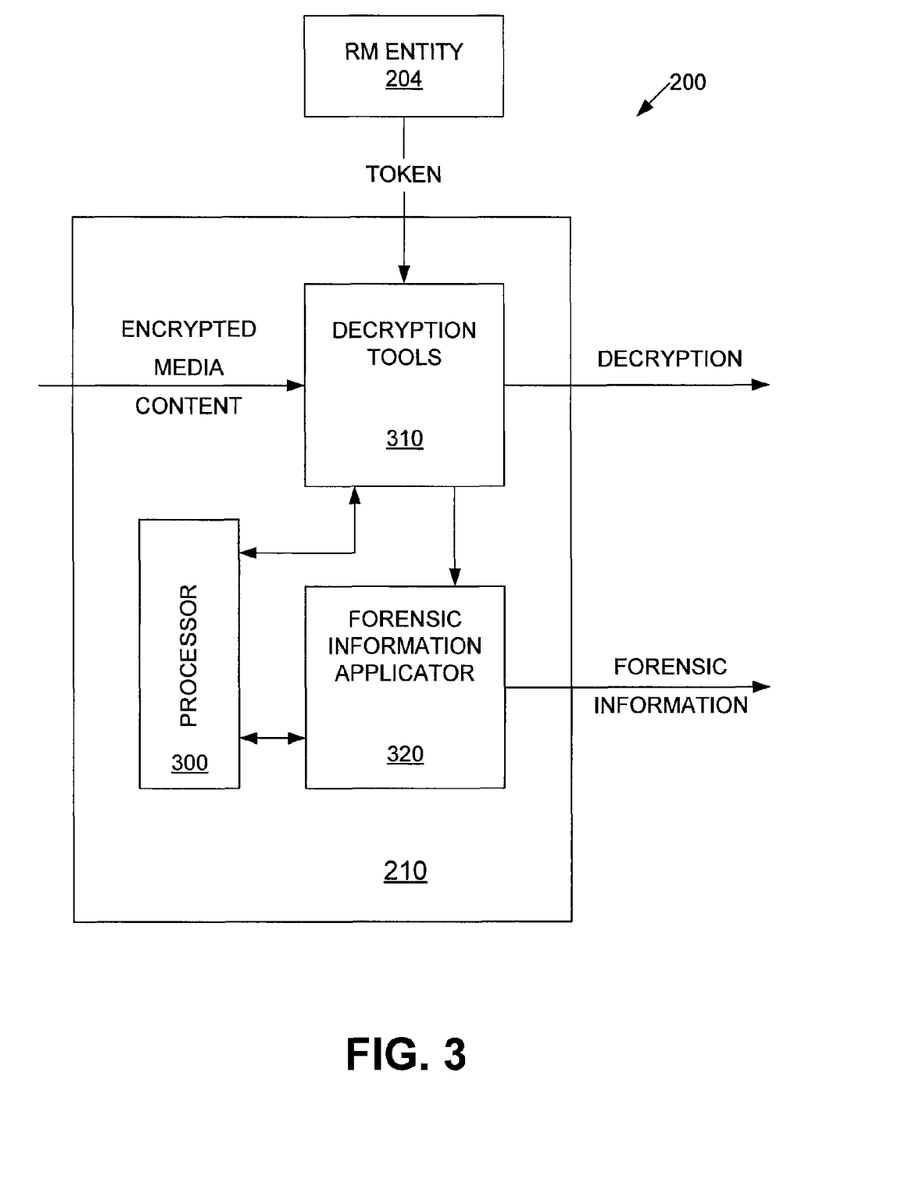
FIG. 3 shows a detailed block diagram of the forensic decryption tools.

FIG. 3 shows a detailed block diagram of the forensic decryption system 200 in accordance with one implementation of the present invention. In the illustrated implementation of FIG. 3, the forensic decryption tools 210 include a processor 300, at least one decryption tool 310, and a forensic information applicator 320. The processor 300 is configured to apply for authentication to make copies of the media content, and to direct the decryption tools 310 to perform decryption of the encrypted media content when a permission (e.g., in the form of a token) is received from the rights management entity 204. The forensic information applicator 320 is configured to make and forensically mark copies of the media content decrypted by the decryption tools 310.

Figure 4:
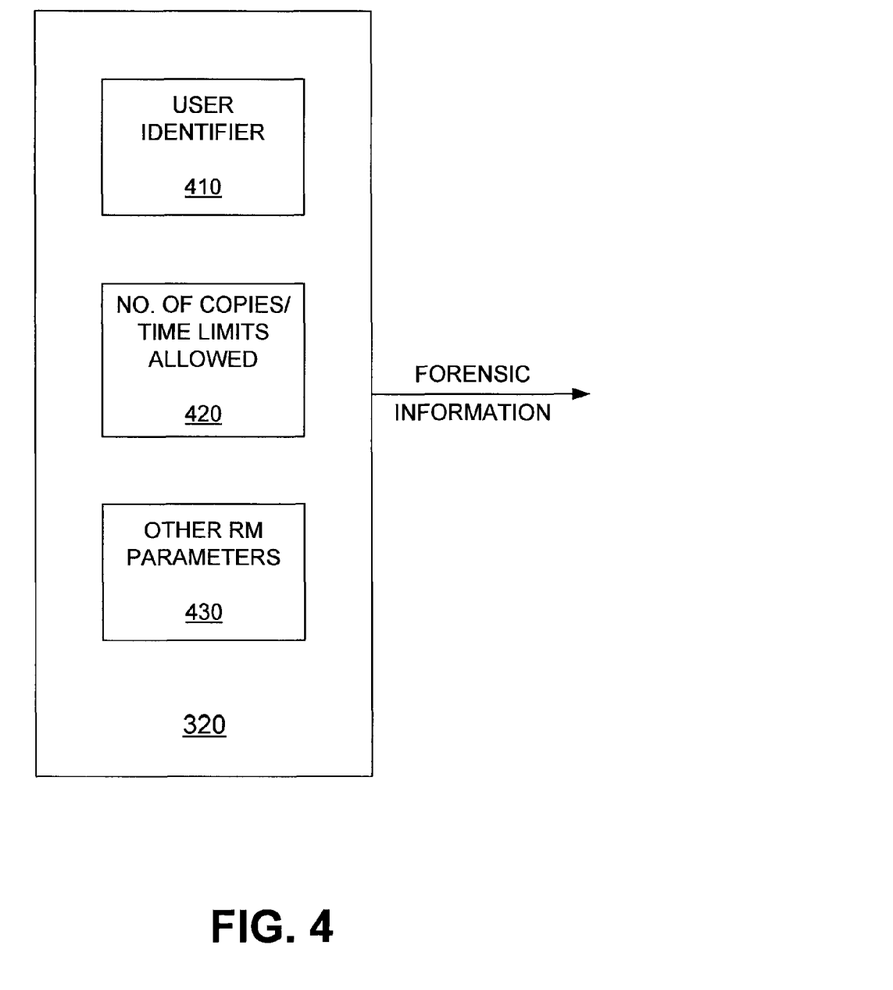
FIG. 4 shows a functional block diagram of the forensic information applicator.

FIG. 4 shows a functional block diagram of the forensic information applicator 320 in accordance with one implementation of the present invention. In the illustrated implementation of FIG. 4, the forensic information applicator 320 includes various modules to perform forensic information application functions. Thus, the applicator 320 includes module 410 to identify the user/copier, module 420 to indicate the number of copies allowed, and module 430 to indicate other related rights management parameters, such as time limits or limits on the level of copying allowed. The forensic information can include one or more watermarks applied to audio and/or video of the content.

Figure 5A:
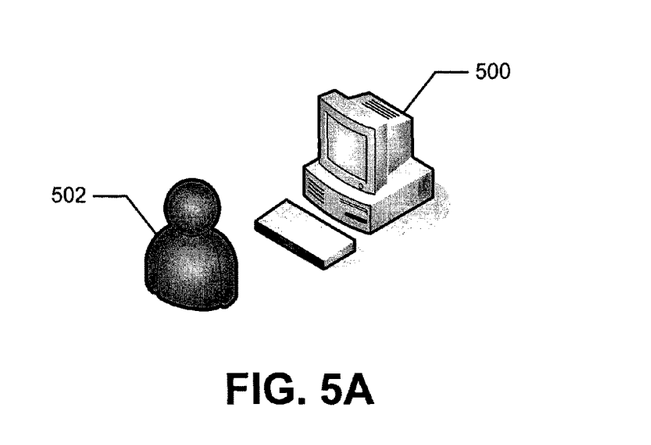
FIG. 5A illustrates a representation of a computer system and a user.

FIG. 5A illustrates a representation of a computer system 500 and a user 502. The user 502 uses the computer system 500 to provide authorized decryption of media content. The computer system 500 stores and executes forensic decryption tools 590.

Figure 5B:
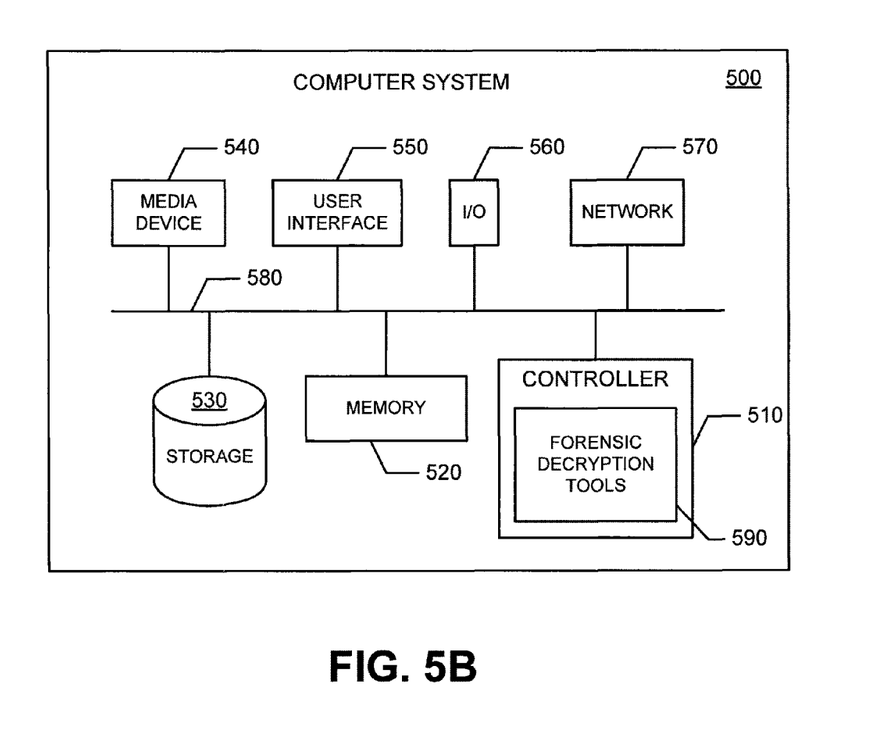
FIG. 5B is a functional block diagram illustrating the computer system hosting the forensic decryption tools.

FIG. 5B is a functional block diagram illustrating the computer system 500 hosting the forensic decryption tools 590. The controller 510 is a programmable processor and controls the operation of the computer system 500 and its components. The controller 510 loads instructions (e.g., in the form of a computer program) from the memory 520 or an embedded controller memory (not shown) and executes these instructions to control the system. In its execution, the controller 510 provides the forensic decryption tools 590 as a software system. Alternatively, this service can be implemented as separate hardware components in the controller 510 or the computer system 500.

Memory 520 stores data temporarily for use by the other components of the computer system 500. In one implementation, memory 520 is implemented as RAM. In one implementation, memory 520 also includes long-term or permanent memory, such as flash memory and/or ROM.

Storage 530 stores data temporarily or long term for use by other components of the computer system 500, such as for storing data used by the forensic decryption tools 590. In one implementation, storage 530 is a hard disk drive.

The media device 540 receives removable media and reads and/or writes data to the inserted media. In one implementation, for example, the media device 540 is an optical disc drive.

The user interface 550 includes components for accepting user input from the user of the computer system 500 and presenting information to the user 502. In one implementation, the user interface 550 includes a keyboard, a mouse, audio speakers, and a display. The controller 510 uses input from the user to adjust the operation of the computer system 500.

The I/O interface 560 includes one or more I/O ports to connect to corresponding I/O devices, such as external storage or supplemental devices (e.g., a printer or a PDA). In one implementation, the ports of the I/O interface 560 include ports such as: USB ports, PCMCIA ports, serial ports, and/or parallel ports. In another implementation, the I/O interface 560 includes a wireless interface for communication with external devices wirelessly.

The network interface 570 includes a wired and/or wireless network connection, such as an RJ-45 or "Wi-Fi" interface (including, but not limited to 802.11) supporting an Ethernet connection.

A system communication path 580 (e.g., a system communication bus) provides for transfers of data and control information between the media device 540, user interface 550, I/O interface 560, network interface 570, storage 530, memory 520, and controller 510.

The computer system 500 includes additional hardware and software typical of computer systems (e.g., power, cooling, operating system), though these components are not specifically shown in FIG. 5B for simplicity. In other implementations, different configurations of the computer system can be used (e.g., different bus or storage configurations or a multi-processor configuration).

Various implementations are or can be implemented primarily in hardware using, for example, components such as application specific integrated circuits ("ASICs"), or field programmable gate arrays ("FPGAs"). Implementations of a hardware state machine capable of performing the functions described herein will also be apparent to those skilled in the relevant art. Various implementations may also be implemented using a combination of both hardware and software.

Furthermore, those of skill in the art will appreciate that the various illustrative logical blocks, modules, connectors, data paths, circuits, and method steps described in connection with the above described figures and the implementations disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Various illustrative implementations of the present invention have been described. However, one of ordinary skill in the art will see that additional implementations are also possible and within the scope of the present invention. For example, while the above description articulates forensic tools which individually mark copies of the media content to track the use, in other implementations, copies of the media content are marked so that the pattern of use of a certain group can be studied. In another example, although the above descriptions indicate that the media content is already available to the user/copier when a request is made to make copies of the media content, in other implementations, the media content can be downloaded along with the decryption tools when the request is made. In other implementations, the media content and the decryption tools are already available to the user/copier when a request is made to make copies of the media content. In this implementation, a permission to make copies can involve only downloading keys and/or tokens, or a simple permission to make copies using the decryption tools in return for monitoring the use of the copies.

Accordingly, the present invention is not limited to only those implementations described above.

The invention claimed is:

1. A method of providing authorized copies of encrypted media content, the method comprising:

receiving at a processor, an application for authentication to make copies of the media content including an electronic request for a decryption tool;

generating forensic information for the media content, wherein the forensic information includes identification information about a user/copier of the media content, a number of copies of the media content allowed to be made, time limits on copying allowed, and limits on a level of copying allowed;

embedding the forensic information in forensic decryption tools;

providing the forensic decryption tools to process the media content by the processor;

transmitting a permission to make copies of the media content using the forensic decryption tools;

performing authorized decryption of the media content on the processor;

making and forensically marking copies by the processor to track uses of the forensically marked copies by a targeted group of users; and analyzing a pattern of use by the targeted group of users of the forensically marked copies.

2. The method of claim 1, wherein said receiving an application for authentication comprises receiving an application to authenticate a user/copier of the media content.

3. The method of claim 2, wherein the user/copier is authenticated when the user/copier first obtains the media content stored on a media disc.

4. The method of claim 2, wherein the user/copier is authenticated when the user/copier later applies to make copies of the previously-obtained media content stored on a media disc.

5. The method of claim 1, wherein said receiving an application for authentication comprises receiving an application to obtain permission from a rights holder to make authorized copies of the media content.

6. The method of claim 1, wherein said receiving an application for authentication comprises receiving an application to obtain permission from a rights management organization to make authorized copies of the media content.

7. The method of claim 1, wherein said transmitting permission comprises transmitting a token or license information to the forensic decryption tools.

8. The method of claim 1, wherein said forensically marking copies comprises modifying a copy of the media content by at least one of adding, changing, and deleting data of the copy of the media content.

9. The method of claim 1, wherein said forensically marking copies comprises marking the copies with the forensic information.

10. The method of claim 1, wherein said forensically marking copies comprises applying one or more watermarks to audio and/or video portion of the media content.

11. The method of claim 1, wherein said forensically marking copies occurs when a user/copier first obtains the media content stored on a media disc.

12. The method of claim 1, wherein the permission is embodied in a token which defines permitted uses of the media content.

13. The method of claim 12, further comprising tracking uses of the forensically marked copies by the targeted group of users.

14. The method of claim 13, wherein said tracking the uses comprises monitoring any misuse of the media content as defined by the token.

15. The method of claim 14, further comprising tracing sources of the authorized copies.

16. The method of claim 14, further comprising revoking the permission for the targeted group of users when the misuse of the media content is detected.

17. The method of claim 16, wherein said revoking the permission comprises disabling the forensic decryption tools so that decryption of the media content is prevented.

18. A forensic decryption system for providing authorized copies of encrypted media content, the apparatus comprising at least one decryption tool;

a processor configured to receive an application for authentication to make copies of the media content, and to direct said at least one decryption tool to perform decryption of the encrypted media content when a permission is received to make the copies of the media content, the processor receives and embeds forensic information for the media content into the at least one decryption tool, wherein the forensic information includes identification information about a user/copier of the media content, a number of copies of the media content allowed to be made, time limits on copying allowed, and limits on a level of copying allowed; and a forensic information applicator configured to make and forensically mark copies to track uses of the forensically marked copies by a targeted group of users, wherein the copies of the media content are marked with the forensic information using the at least one decryption tool, and wherein the processor runs an analysis of a pattern of use of the forensically marked copies by the targeted group of users.

19. The system of claim 18, wherein said forensic information applicator comprises an applicator configured to apply one or more watermarks to audio and/or video portion of the media content.

20. The system of claim 18, wherein the permission is embodied in a token which defines permitted uses of the media content.

21. The system of claim 20, wherein the processor tracks the uses of the forensically marked copies by the targeted group of users.

22. The system of claim 21, wherein the processor tracks the uses by monitoring any misuse of the media content as defined by the token.

23. The system of claim 22, wherein the processor further traces sources of the authorized copies.

24. The system of claim 22, wherein the processor revokes the permission for the targeted group of users when the misuse of the media content is detected.

25. The system of claim 24, wherein the processor revokes the permission by disabling the forensic decryption tools so that the decryption of the media content is prevented.

26. A non-transitory computer-readable storage medium storing a computer program for providing authorized copies of encrypted media content, the computer program comprising executable instructions that cause a computer to:

receive an application for authentication to make copies of the media content including an electronic request for a decryption tool;
generate forensic information for the media content,
wherein the forensic information includes identification information about a user/copier of the media content, a number of copies of the media content allowed to be made, time limits on copying allowed, and limits on a level of copying allowed;
embed the forensic information in forensic decryption tools;
provide the forensic decryption tools to process the media content;
transmit a permission to make copies of the media content using the forensic decryption tools;
perform authorized decryption of the media content;
make and forensically mark copies to track uses of the forensically marked copies by a targeted group of users; and
analyze a pattern of use by the targeted group of users of the forensically marked copies.

27. A method of providing authorized copies of media content, the method comprising:

sending a request to make copies of the media content by a particular group using forensic decryption tools including an electronic request for a decryption tool;
receiving forensic information for the media content embedded in the forensic decryption tools,
wherein the forensic information includes identification information about a user/copier of the media content, a number of copies of the media content allowed to be made, time limits on copying allowed, and limits on a level of copying allowed;
performing authorized decryption of the media content;
making and forensically marking copies to track uses of the forensically marked copies by a targeted group of users; and
analyze a pattern of use by the targeted group of users of the forensically marked copies.

28. The method of claim 27, wherein the media content and the forensic decryption tools are provided on a media disc.

29. The method of claim 27, wherein the media content and the forensic decryption tools are provided by downloading from a website.

* * * * *